(12) United States Patent
Wang et al.

(10) Patent No.: US 8,471,891 B2
(45) Date of Patent: Jun. 25, 2013

(54) VIDEO SWITCHING SYSTEM AND METHOD

(75) Inventors: Chih-Huang Wang, Tu-Cheng (TW);
Hsieh-Fu Tsai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 203 days.

(21) Appl. No.: 13/095,891

(22) Filed: Apr. 28, 2011

(65) Prior Publication Data

US 2012/0212571 A1     Aug. 23, 2012

(30) Foreign Application Priority Data

Feb. 17, 2011   (CN) .......................... 2011 1 0039797

(51) Int. Cl.
*H04N 7/15*     (2006.01)
*H04N 7/14*     (2006.01)

(52) U.S. Cl.
USPC .................................... 348/14.08; 348/14.11

(58) Field of Classification Search
USPC .................. 348/E7.084, 14.09, 14.08, 14.01, 348/E7.083, 14.11, 211.12; 370/260; 455/416, 455/403; 709/204
See application file for complete search history.

(56) References Cited

U.S. PATENT DOCUMENTS

| | | | |
|---|---|---|---|
| 6,744,460 B1 * | 6/2004 | Nimri et al. | 348/14.11 |
| 6,963,353 B1 * | 11/2005 | Firestone | 348/14.09 |
| 2007/0211141 A1 * | 9/2007 | Christiansen | 348/14.08 |

* cited by examiner

*Primary Examiner* — Curtis Kuntz
*Assistant Examiner* — Sunita Joshi
(74) *Attorney, Agent, or Firm* — Altis Law Group, Inc.

(57) ABSTRACT

A video switching system detects speaking information of at least one speaker in a video conference according to a reference time. One participant is regarded as one speaker if the one participant speaks longer than the reference time. The video switching system determines a main speaker of the at least one speaker according to the speaking information of the at least one speaker. The video switching system calculates an image switching frequency, and determines whether to switch to a video image of the main speaker according to the image switching frequency. The video switching system calculates a response time if determining to switch to the video image of the main speaker, and adjusts the reference time according to the image switching frequency and the response time.

10 Claims, 7 Drawing Sheets

VIDEO SWITCHING SYSTEM AND METHOD

BACKGROUND

1. Technical Field

The present disclosure relates to video conference systems, and more particularly to a video switching system and method.

2. Description of Related Art

A video conference is a set of interactive telecommunication technologies which allows for people located in two or more locations to interact via two-way video and audio transmissions simultaneously. It has also been called "visual collaboration" and is a type of groupware. Video images of the video conference often need to be switched.

It becomes a big challenge to how to switch the video images of the video conference neither slowly nor excessively frequently.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
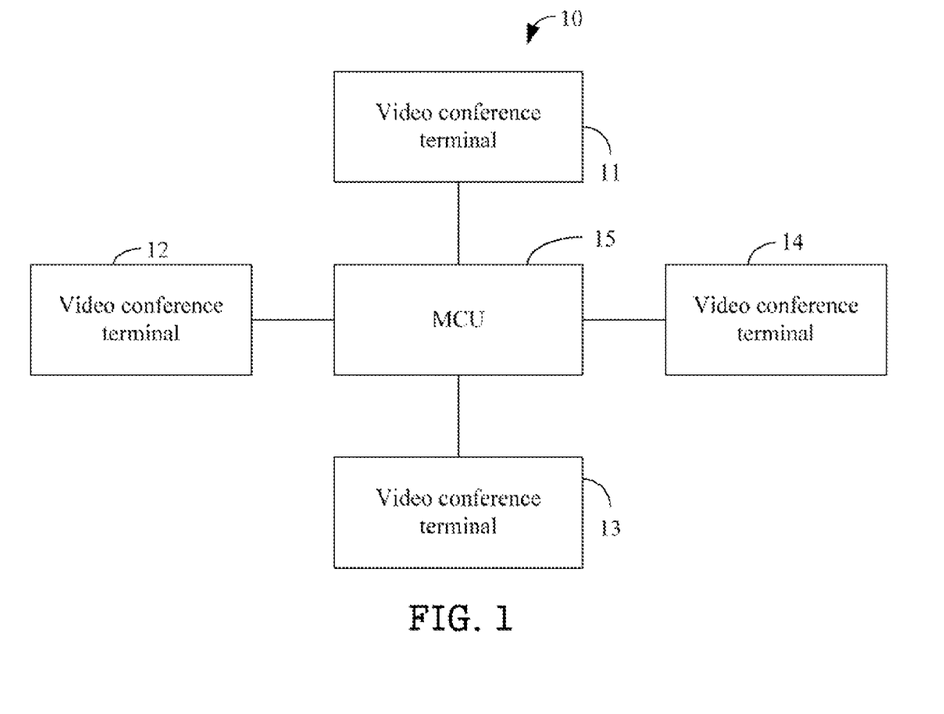
FIG. 1 is schematic diagram of an application environment of one embodiment of a video switching system in accordance with the present disclosure.

FIG. 1 is schematic diagram of an application environment of one embodiment of a video switching system in accordance with the present disclosure. In one embodiment, the video switching system may be applied in a centralized video conference system 10 including a plurality of video conference terminals 11, 12, 13, 14 (only four shown) and a multipoint control unit (MCU) 15. The plurality of video conference terminals 11, 12, 13, 14 are located in different locations (e.g., cities) with each having at least one participant. Each video conference terminal 11, 12, 13, or 14 acquires video and audio information of the each location, and transmits the video and audio information of the each location to one another via the MCU 15.

The MCU 15 can control each video conference terminal 11, 12, 13, 14 to display video images of one or more locations on a local display device of each video conference terminal 11, 12, 13, 14, and can also control each video conference terminal 11, 12, 13, 14 to switch the video images displayed on each video conference terminal 11, 12, 13, 14 according to speaking information of participants of each location.

In one embodiment, participants attend a video conference via the video conference terminals 11, 12, 13, 14 and the MCU 15. The MCU 15 detects speaking information of at least one speaker in the video conference according to a reference time. The speaking information is one or more voice streams acquired by the video conference terminal 11, 12, 13, or 14 of FIG. 1. One participant is regarded as one speaker if the one participant speaks longer than the reference time, such as one second. It should be noted that there is a negative correlation between the reference time and a sensitivity of switching video images of the video conference. That is, the longer the reference time is, the lower the sensitivity of switching the video images of the video conference is. The shorter the reference time is, the higher the sensitivity of switching the video images of the video conference is.

The MCU 15 determines a main speaker of the at least one speaker according to the speaking information of the at least one speaker. In detail, the MCU 15 sets at least one priority order for the at least one speaker according to the speaking information of the at least one speaker, and determines whether a number of the at least one speaker equals to one. Then, the MCU 15 determines whether the at least one priority order of each of the at least one speaker is equivalent upon the condition that the number of the at least one speaker is greater than one. The MCU 15 determines that the only one speaker is the main speaker upon the condition that the number of the at least one speaker equals to one. The MCU 15 determines that one speaker speaking for the longest time is the main speaker upon the condition that the at least one priority order of each of the at least one speaker is equivalent. The MCU 15 determines that one speaker with the highest priority order is the main speaker upon the condition that the at least one priority order of each of the at least one speaker is not equivalent.

The MCU 15 calculates an image switching frequency. The image switching frequency is a number of times that the video images have been switched per unit time such as five seconds.

The MCU 15 determines whether to switch to a video image of the main speaker according to the image switching frequency. The video image of the main speaker indicates that a video image has been acquired by one video conference terminal where the main speaker is located. In one embodiment, the MCU 15 determines not to switch to the video image of the main speaker upon the condition that the image switching frequency is greater than a switching standard value. The MCU 15 determines to switch to the video image of the main speaker upon the condition that the image switching frequency is not greater than the switching standard value. In one example, the switching standard value may be one time per five seconds.

After determining to switch to the video image of the main speaker, the MCU 15 calculates a response time, which is a time difference between a time point of the main speaker starting to speak and a time point of the MCU 15 determining to switch to the video image of the main speaker.

The MCU 15 adjusts the reference time according to the image switching frequency and the response time. In detail, the MCU 15 increases the reference time upon the condition that the image switching frequency is greater than the switching standard value, and decreases the reference time upon the condition that the response time is greater than a response standard value.

In one embodiment, the presentation methods for switching to the video image of the main speaker can be designed according to different requirements. For example, the video image of the main speaker can be marked via a bold outline, or be magnified to a full screen.

Figure 2:
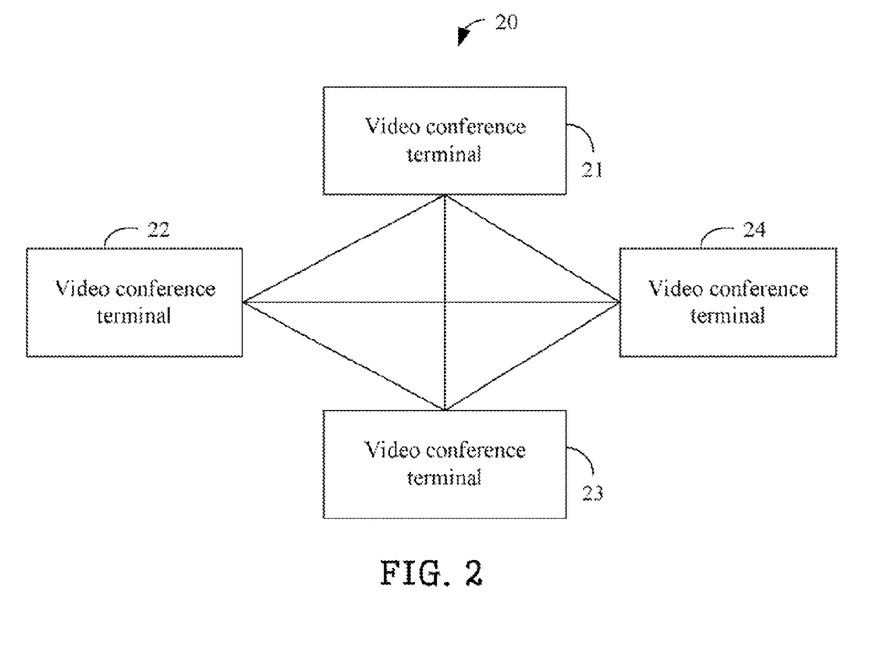
FIG. 2 is a schematic diagram of an application environment of another embodiment of the video switching system in accordance with the present disclosure.

FIG. 2 is a schematic diagram of an application environment of another embodiment of the video switching system in accordance with the present disclosure. In one embodiment, the video switching system is applied in a decentralized video conference system 20 including a plurality of video conference terminals 21, 22, 23, 24 (only four shown). The plurality of video conference terminals 21, 22, 23, 24 are located in different locations (e.g., cities) with each having at least one participant. Each video conference terminal 21, 22, 23, 24 acquires video and audio information of each location, and transmits the video and audio information of each location to one another.

Each video conference terminal 21, 22, 23, 24 can display one or more video images of one or more locations on a local display device of each video conference terminal 21, 22, 23, 24, and switches the one or more video images according to speaking information of the at least one participant.

Figure 3:
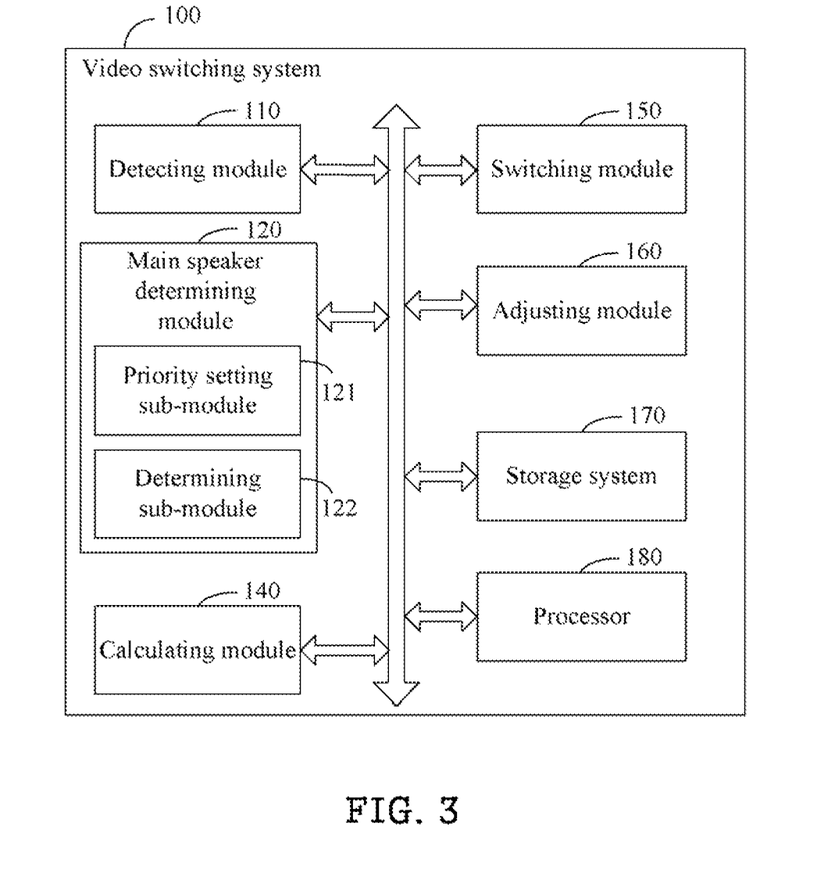
FIG. 3 is a schematic diagram of one embodiment of the video switching system including functional modules.

FIG. 3 is a schematic diagram of one embodiment of a video switching system 100 including functional modules. In one embodiment, the video switching system 100 can be applied in the MCU 15 of FIG. 1, and can also be applied in any one video conference terminal 21, 22, 23, or 24 of FIG. 2.

In one embodiment, the video switching system 100 includes a detecting module 110, a main speaker determining module 120, a calculating module 140, a switching module 150, an adjusting module 160, a storage system 170, and at least one processor 180. The modules 110-160 may comprise computerized code in the form of one or more programs that are stored in the storage system 170. The computerized code includes instructions that are executed by the at least one processor 180 to provide functions for the modules 110-160. In one example, the storage system 170 may be a hard disk drive, flash memory, or other computerized memory device.

The storage system 180 is operable to store data related to a video conference such as audio information, video information, a reference time, an image switching frequency. One participant of the video conference is regarded as one speaker if the one participant speaks longer than the reference time such as one second. The image switching frequency is a number of times that the video images of the video conference have been switched per unit time such as five seconds.

The detecting module 110 is operable to detect speaking information of at least one speaker in the video conference according to the reference time.

The main speaker determining module 120 is operable to determine a main speaker of the at least one speaker according to the speaking information of the at least one speaker. In one embodiment, the main speaker determining module 120 includes a priority setting sub-module 121 and a determining sub-module 122.

The priority setting sub-module 121 is operable to set at least one priority order for the at least one speaker according to the speaking information of the at least one speaker. In one embodiment, the priority setting module 121 can set a higher priority order to participant B than participant A according to three situations of FIG. 4.

Figure 4:
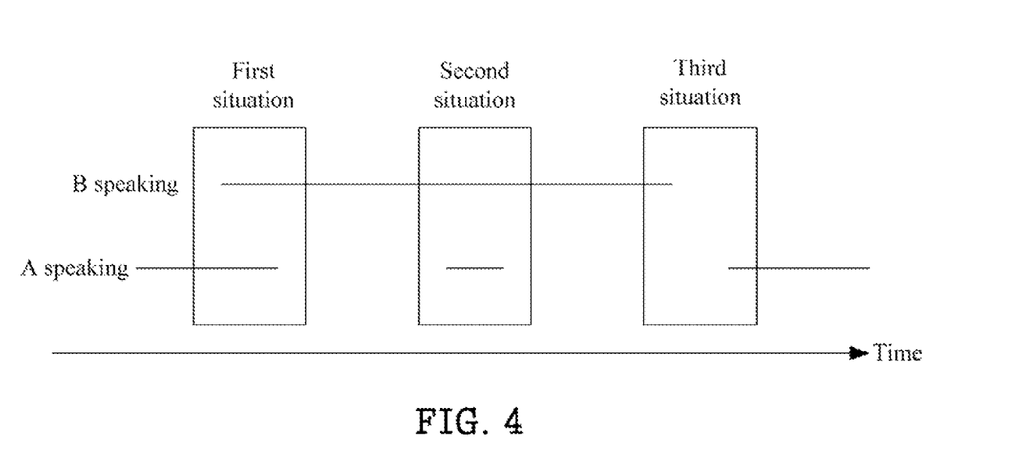
FIG. 4 is a schematic diagram showing speaking information of the video switching system in accordance with the present disclosure.

Referring to FIG. 4, one straight line corresponding to participant B indicates that participant B is speaking, and three straight lines corresponding to participant A indicates that participant A is speaking. In a first situation, participant B interrupts to speak while participant A is speaking, and subsequently participant A stops speaking. In a second situation, participant A interrupts to speak while participant B is speaking, and participant B does not stop speaking. In a three situation, participant A starts to speak after participant A stops speaking for at least five seconds. In the above three situations, the priority setting sub-module 121 sets a higher priority order to participant B than participant A.

The determining sub-module 122 is operable to determine whether a number of the at least one speaker equals to one, and determine whether the at least one priority order of each of the at least one speaker is equivalent upon the condition that the number of the at least one speaker is greater than one. In one embodiment, the determining sub-module 122 determines that the only one speaker is the main speaker upon the condition that the number of the at least one speaker equals to one. The determining sub-module 122 determines that one speaker speaking for the longest time is the main speaker upon the condition that the at least one priority order of each of the at least one speaker is equivalent. The determining sub-module 122 determines that one speaker with the highest priority order is the main speaker upon the condition that the at least one priority order of each of the at least one speaker is not equivalent.

The calculating module 140 is operable to calculate an image switching frequency. The image switching frequency is a number of times that the video images of the video conference have been switched per unit time such as five seconds. In one embodiment, the main speaker determining 120 has determined the main speaker but has not determined whether to switch to the video image of the main speaker. However, the calculating module 140 assumes the video image of the main speaker has been switched, and accordingly adds the assumed switching result to a final calculated result. In one instance, the video image of one video conference has been changed only one time and a video image of the main speaker has determined but not been switched within five seconds. In such a case, the calculating module 140 calculates an image switching result as two times per five seconds. In another example, the video image of one video conference has no change, and a video image of the main speaker has determined but not been switched within five seconds. In such a case, the calculating module 140 calculates an image switching result as one time per five seconds.

The switching module 150 is operable to determine whether to switch to the video image of the main speaker according to the image switching frequency. The video image of the main speaker indicates that a video image acquired by one video conference terminal where the main speaker is located. In one embodiment, the switching module 150 determines not to switch to the video image of the main speaker upon the condition that the image switching frequency is greater than a switching standard value. The switching module 150 determines to switch to the video image of the main speaker upon the condition that the image switching frequency is not greater than the switching standard value. In one example, the switching standard value may be one time per five seconds.

Figure 5:
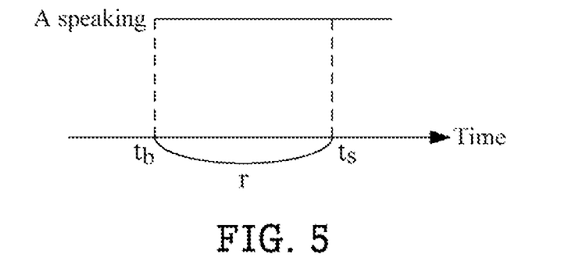
FIG. 5 is a schematic diagram showing a response time of the video switching system in accordance with the present disclosure.

After determining to switch to the video image of the main speaker, the calculating module 140 calculates a response time. The response time is a time difference between a time point of the main speaker starting to speak and a time point of the switching module 150 determining to switch to the video image of the main speaker. Referring to FIG. 5, $t_b$ indicates a time point of speaker A starting to speak, and $i_s$ indicates a time point of the switching module 150 determining to switch to the video image of the main speaker. Accordingly, the time difference r between $t_b$ and $i_s$ is the response time.

The adjusting module 160 is operable to adjust the reference time according to the image switching frequency and the response time. In detail, the adjusting module 160 increases the reference time upon the condition that the image switching frequency is greater than the switching standard value such as one time per five seconds. The adjusting module 160 decreases the reference time upon the condition that the response time is greater than a response standard value such as 1.five second.

In one embodiment, the adjusting module 160 increases the reference time by a value of (a sensitivity adjusting unit*the image switching frequency/the switching standard value) when the image switching frequency is greater than the switching standard value. The adjusting module 160 decreases the reference time by a value of (the sensitivity adjusting unit*the response time/the response standard value) when the response time is greater than the response standard value. In one example, the sensitivity adjusting unit may be set to one second.

Figure 6:
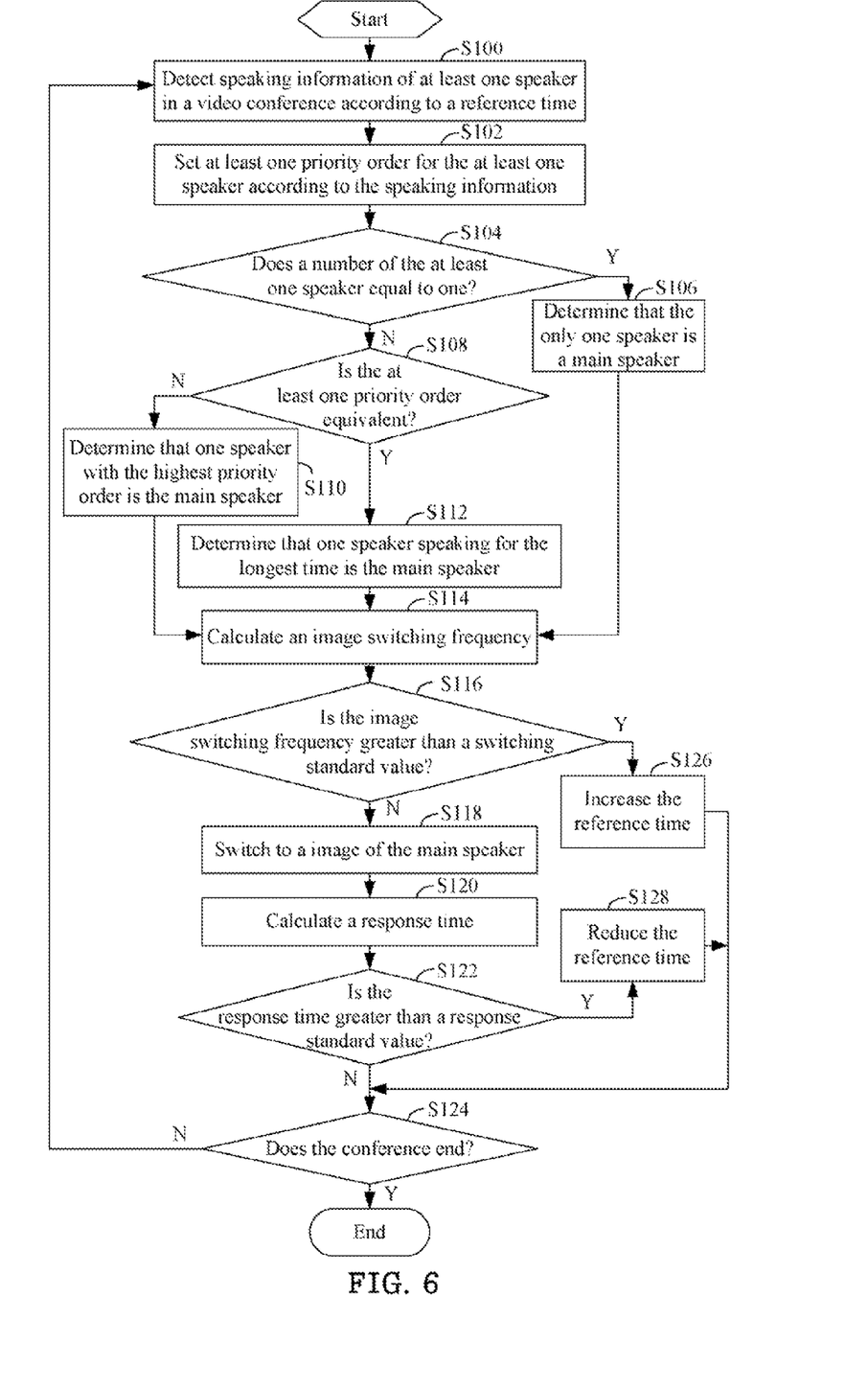
FIG. 6 is a flowchart of one embodiment of a video switching method in accordance with the present disclosure.

FIG. 6 is a flowchart of one embodiment of a video switching method in accordance with the present disclosure. In one embodiment, the video switching method may be embodied in the video switching system 100 of FIG. 3, and is executed by the functional modules such as those of FIG. 3. Depending on the embodiment, additional blocks may be added, others deleted, and the ordering of the blocks may be changed while remaining well within the scope of the disclosure.

When a video conference starts, in block S100, the detecting module 110 detects speaking information of at least one speaker in one video conference according to a reference time.

In block S102, the main speaker determining module 120 sets at least one priority order for the at least one speaker according to the speaking information.

In block S104, the main speaker determining module 120 determines whether a number of the at least one speaker equals to one.

If the number of the at least one speaker equals to one, in block S106, the determining sub-module 122 determines that the only one speaker is the main speaker.

If the number of the at least one speaker is greater than one, in block S108, the main speaker determining module 120 determines whether the at least one priority order of each of the at least one speaker is equivalent.

If the at least one priority order of each of the at least one speaker is not equivalent, in block S110, the main speaker determining module 120 determines that one speaker with the highest priority order is the main speaker.

If the at least one priority order of each of the at least one speaker is equivalent, in block S112, the main speaker determining module 120 determines that one speaker speaking for the longest time is the main speaker.

In general, the main speaker determining module 120 determines the main speaker via blocks S102 to S112.

In block S114, the calculating module 140 calculates an image switching frequency. The image switching frequency is a number of times that the video images have been switched per unit time such as five seconds.

In block S116, the switching module 150 determines whether the image switching frequency is greater than a switching standard value so as to determine whether to switch to a video image of the main speaker. The video image of the main speaker indicates that a video image acquired by one video conference terminal where the main speaker is located. In one example, the switching standard value may be one time per five seconds.

If the image switching frequency is greater than the switching standard value, the switching module 150 determines not to switch to the video image of the main speaker. Accordingly, in block S126, the adjusting module 160 increases the reference time so as to lower a sensitivity of switching video images. In one embodiment, the adjusting module 160 increases the reference time by a value of (a sensitivity adjusting unit*the image switching frequency/the switching standard value) when the image switching frequency is greater than the switching standard value. In one example, the sensitivity adjusting unit may be set to one second.

If the image switching frequency is not greater than the switching standard value, the switching module 150 switches to the video image of the main speaker.

In block 120, the calculating module 140 calculates a response time. The response time is a time difference between a time point of the main speaker starting to speak and a time point of the switching module 150 having switched to the video image of the main speaker.

In block S122, the adjusting module 160 determines whether the response time is greater than a response standard value. In one example, the response time may be 1.five seconds.

If the response time is greater than the response standard value, in block S128, the adjusting module 160 decreases the reference time so as to enhance the sensitivity of switching video images. In one embodiment, the adjusting module 160 decreases the reference time by a value of (the sensitivity adjusting unit*the response time/the response standard value) when the response time is greater than the response standard value.

In general, the adjusting module 160 adjusts the reference time according to the image switching frequency and the response time via blocks S126 and S128 in order to adjust the sensitivity of switching video images of the video conference.

If the response time is not greater than the response standard value, in block S124, the video switching system 100 determines whether the video conference ends.

If the video conference does not end, going back to block S100, the detecting module 110 continues to detect speaking information according to the adjusted reference time. Then, blocks S102 to S128 are repeated until the video conference ends.

Figure 7:
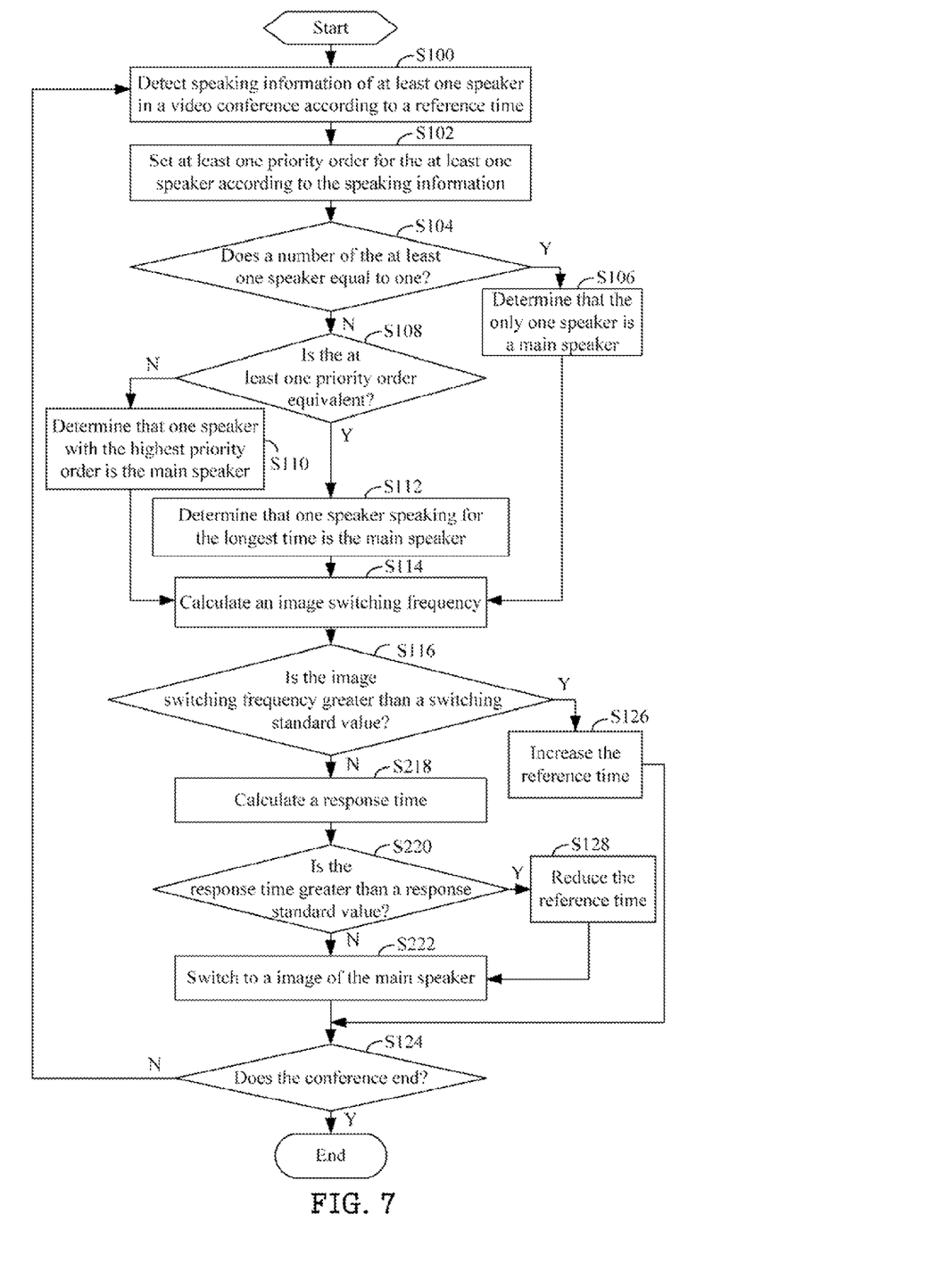
FIG. 7 is a flowchart of another embodiment of the video switching method in accordance with the present disclosure.

FIG. 7 is a flowchart of another embodiment of the video switching method in accordance with the present disclosure. The video switching method of this embodiment is very similar to that of FIG. 6, and only orders of blocks S218, S220, S222 is different from orders of blocks S118, 120, S122.

In block S218, the calculating module 140 calculates a response time. The response time is a time difference between a time point of the main speaker starting to speak and a time point of the switching module 150 determining to switch to the video image of the main speaker. The time point of the switching module 150 determining to switch to the video image of the main speaker is the same as a time point of the switching module 150 determining that the image switching frequency is not greater than the switching standard value.

In block S220, the adjusting module 160 determines whether the response time is greater than the response standard value such as 1.five second.

If the response is not greater than the response standard value, in block S122, the switching module 150 switches to the video image of the main speaker.

It should be noted that the time difference between the time point of the switching module 150 determining to switch to the video image of the main speaker and the time point of the switching module 150 having switched to the video image of the main speaker is very short and can be ignored. Therefore, the response time calculated by block S120 of FIG. 6 is equivalent to the response time calculated by block S218 of FIG. 7.

In conclusion, the video switching system 100 dynamically adjusts the reference time according to the response time and the image switching frequency in order to dynamically adjust the sensitivity of switching video images of the video conference. Thus, the video images of the video conference are switched neither slowly nor excessively frequently.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. A video switching system operable to switch video images of a plurality of participants in a video conference, the video switching system comprising:
   a storage system;
   at least one processor;
   one or more programs that are stored in the storage system and are executed by the at least one processor, the one or more programs comprising:
      a detecting module operable to detect speaking information of at least one speaker in the video conference according to a reference time, wherein one participant is regarded as one speaker if the one participant speaks longer than the reference time;
      a main speaker determining module operable to determine a main speaker of the at least one speaker according to the speaking information of the at least one speaker;
      a calculating module operable to calculate an image switching frequency of the video conference, wherein the image switching frequency is a number of times that the video images of the video conference have been switched per unit time;
      a switching module operable to determine whether to switch to a video image of the main speaker according to the image switching frequency, wherein the calculating module further calculates a response time when the switching module determines to switch to the video image of the main speaker, where the response time is a time difference between a time point of the main speaker starting to speak and a time point of the switching module determining to switch to the video image of the main speaker;
      an adjusting module operable to adjust the reference time according to the image switching frequency and the response time;
      wherein the adjusting module increases the reference time by a value of a sensitivity adjusting unit * the image switching frequency / a switching standard value when the image switching frequency is greater than the switching standard value, and decreases the reference time by the value of the sensitivity adjusting unit * the response time / a response standard value when the response time is greater than the response standard value.

2. The video switching system of claim 1, wherein the main speaker determining module comprises:
   a priority setting sub-module operable to set at least one priority order for the at least one speaker according to the speaking information of the at least one speaker; and
   a determining sub-module operable to determine whether a number of the at least one speaker is equal to one, and determine whether the at least one priority order of each of the at least one speaker is equivalent upon the condition that the number of the at least one speaker is greater than one.

3. The video switching system of claim 2, wherein:
   when the number of the at least one speaker equals is equal to one, the determining sub-module determines that the only one speaker is the main speaker;
   when the at least one priority order of each of the at least one speaker is equivalent, the determining sub-module determines that one speaker speaking for the longest time is the main speaker; and
   when the at least one priority order of each of the at least one speaker is not equivalent, the determining sub-module determines that one speaker with the highest priority order is the main speaker.

4. The video switching system of claim 1, wherein the switching module is operable to determine not to switch to the video image of the main speaker upon the condition that the image switching frequency is greater than the switching standard value, and determine to switch to the video image of the main speaker upon the condition that the image switching frequency is not greater than the switching standard value.

5. The video switching system of claim 4, wherein the adjusting module increases the reference time upon the condition that the image switching frequency is greater than the switching standard value, and decreases the reference time upon the condition that the response time is greater than the response standard value.

6. A video switching method for switching video images of a plurality of participants in a video conference, the video switching method comprising:
   detecting speaking information of at least one speaker in the video conference according to a reference time, wherein one participant is regarded as one speaker if the one participant speaks longer than the reference time;
   determining a main speaker of the at least one speaker according to the speaking information of the at least one speaker;
   calculating an image switching frequency of the video conference, wherein the image switching frequency is a number of times that the video images of the video conference have been switched per unit time;
   determining whether to switch to a video image of the main speaker according to the image switching frequency;
   calculating a response time if determining to switch to the video image of the main speaker, wherein the response time is a time difference between a time point of the main speaker starting to speak and a time point of determining to switch to the video image of the main speaker;
   adjusting the reference time according to the image switching frequency and the response time; and
   providing at least one processor executing the above steps;
   wherein the step of adjusting the reference time according to the image switching frequency and the response time comprises:
      increasing the reference time by a value of a sensitivity adjusting unit * the image switching frequency / a switching standard value if the image switching frequency is greater than the switching standard value; and decreasing the reference time by the value of the sensitivity adjusting unit * the response time / a response standard value if the response time is greater than the response standard value.

7. The video switching method of claim 6, wherein the step of determining a main speaker of the at least one speaker according to the speaking information of the at least one speaker comprises:

setting at least one priority order for the at least one speaker according to the speaking information of the at least one speaker;

determining whether a number of the at least one speaker equals is equal to one; and determining whether the at least one priority order of each of the at least one speaker is equivalent if the number of the at least one speaker is greater than one.

8. The video switching method of claim 7, wherein the step of determining a main speaker of the at least one speaker according to the speaking information of the at least one speaker comprises:

determining that the only one speaker is the main speaker if the number of the at least one speaker is equal to one;

determining that one speaker speaking for the longest time is the main speaker if the at least one priority order of each of the at least one speaker is equivalent; and determining that one speaker with the highest priority order is the main speaker if the at least one priority order of each of the at least one speaker is not equivalent.

9. The video switching method of claim 6, wherein the step of determining whether to switch to a video image of the main speaker comprises:

determining not to switch to the video image of the main speaker if the image switching frequency is greater than the switching standard value; and determining to switch to the video image of the main speaker if the image switching frequency is not greater than the switching standard value.

10. The video switching method of claim 9, wherein the step of adjusting the reference time according to the image switching frequency and the response time comprises:

increasing the reference time if the image switching frequency is greater than the switching standard value; and decreasing the reference time if the response time is greater than the response standard value.

* * * * *